United States Patent Office 3,449,409
Patented June 10, 1969

3,449,409
PROCESS FOR PREPARING PROSPHONIC ACIDS
Riyad R. Irani and Robert S. Mitchell, St. Louis, Mo., assignors to Monsanto Company, St. Louis, Mo., a corporation of Delaware
No Drawing. Continuation-in-part of application Ser. No. 547,759, May 5, 1966. This application Sept. 13, 1966, Ser. No. 578,967
Int. Cl. C07f 9/38; C07c 53/14
U.S. Cl. 260—502.4         16 Claims

ABSTRACT OF THE DISCLOSURE

The present invention relates to processes for preparing phosphonic acids such as 1-hydroxy, ethylidene diphosphonic acid. More specifically this process comprises the contacting of a phosphorus trihalide such as phosphorus trichloride with a lower aliphatic monocarboxylic acid such as glacial acetic acid in a reaction zone maintained at a temperature of 10° C. to 80° C. to continuously form a liquid reaction product. After the formation of said liquid reaction product, said reaction product is heated to and maintained at a temperature of 90° C. to 180° C. and concurrently with said heating there is distilled off substantially all of the organo-chloride by-product as a gas from said reaction zone. Subsequent to the sequential steps of the formation of the liquid reaction product and the distillation of the organo-chloride by-product, a portion of said by-product is added at certain rates to the liquid reaction product which is maintained at a temperature of 90° C. to 180° C. to form a normally anhydrous, solid reaction material. Thereafter, the desired diphosphonic acid is recovered from said anhydrous reaction product by means of, for example, steam treatment.

---

This application is a continuation-in-part application of Ser. No. 547,759, filed May 5, 1966, and now abandoned.

The present invention relates to processes for preparing phosphonic acids and, more particularly, to an improved process for preparing 1-hydroxy, organo-1,1-diphosphonic acids, particularly 1-hydroxy, lower alkylidene-1,1-diphosphonic acids, which is adaptable to continuous operation.

A principal object of the present invention is to provide a novel process for preparing 1-hydroxy, organo-1,1-diphosphonic acids in an improved manner.

Another object of the present invention is to provide a process for preparing 1-hydroxy, organo-1,1-diphosphonic acids which is adaptable for continuous operation.

A further object of the present invention is to provide a process for preparing 1-hydroxy, oragno-1,1-diphosphonic acids which, among other things, is easily and selectively controlled, utilizes a by-product in the process, and enables the preparation of the desired phosphonic acids in high yields and purity (especially with respect to orthophosphorus acid content).

These and other objects will become apparent from a reading of the following detailed description.

It has now been found that 1-hydroxy, organo-1,1-diphosphonic acids can be prepared advantageously by reacting a lower aliphatic mono-carboxylic acid and a phosphorus trihalide (phosphorus tribromide or phosphorus trichloride) in a reaction sequence such that at least some of the organo-halide (bromide or chloride) by-product from the reaction is utilized as a reactant to prepare the desired phosphonic acids as will be more fully discussed hereinafter. By following the teachings of the present invention many and various advantages are realized which include the preparation of the desired phosphonic acids in high yields, such as greater than about 97%, and purity, such as containing less than about 3% of $H_3PO_3$. Moreover, the process utilizes at least some of the by-product organo-halide which would otherwise have to be disposed of as well as providing a process which is easily and selectively controlled.

The following is the overall reaction utilizing phosphorus trichloride as the phosphorus trihalide reactant and stoichiometric amounts of the reactants:

(I)
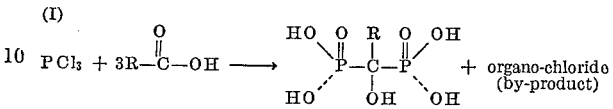

wherein R is an aliphatic group containing from 1 to about 6 carbon atoms. Although R can represent unsaturated hydrocarbyl groups such as ethylenically unsaturated hydrocarbyl groups (alkenyl) and the like, it is preferred that R be an alkyl group.

The compounds that can be prepared by the processes of the present invention, i.e., compounds II above, are herein generically termed "1-hydroxy, organo-1,1-diphosphonic acids" and when R is a preferred alkyl group such are herein generically termed "1-hydroxy, lower alkylidene-1,1-diphosphonic acids." The compounds can also be termed alkane, 1-hydroxy, 1,1-diphosphonic acids. Such compounds have been found to be useful as sequestering agents for heavy metal cations in aqueous systems.

The lower aliphatic mono-carboxylic acids which can be used in the present invention include acetic acid, acrylic acid, propionic acid, propiolic acid, isobutyric acid, methacrylic acid, n-butyric acid, vinylacetic acid, ethylmethyl acetic acid, and the like. It is preferred to use such acids having a concentration above about 97% (by weight), although acids containing minor amounts of water can be used.

In general, the process of the present invention is directed to reacting in a reaction zone a lower aliphatic monocarboxylic acid and a phosphorus trihalide (phosphorus tribromide or phosphorus trichloride) to form a liquid reaction product, heating this liquid product in the reaction zone to elevated temperatures while removing by-product organo-halide as a gas from the reaction zone, returning at least a portion of the by-product organo-halide to the reaction zone for reacting with said liquid reaction product whereby a normally solid anhydrous reaction product is formed, and thereafter recovering the desired product, a 1-hydroxy, organo-1,1-diphosphonic acid, from the normally solid anhydrous reaction product.

The liquid reaction product which is first formed in the process of the present invention by reacting the carboxylic acid and phosphorus trihalide is believed to be essentially or predominantly phosphorus acid (including ortho- and pyro-phosphorous acid and mixtures of these) and acylated derivatives thereof (usually in minor amounts) and containing, in addition, by-product organo-halide (carboxylic acid bromide or chloride), hydrohalide acids (HBr or HCl), unreacted carboxylic acid and the like. This reaction product can be prepared by mixing or blending the carboxylic acid and phosphorus trihalide in a molar ratio of at least about 2:1 (carboxylic acid:$PX_3$) and preferably at least about 3:1, although slight excess amounts of carboxylic acid are especially such as about 10% to about 50% by weight of the reactants.

The reaction is carried out under temperatures which are sufficient to maintain the mixture of reaction product and by-product organo-halide liquid and which can vary depending upon the carboxylic acid used and the like but are usually from about 10° C. to about 80° C. with moderate temperatures of from about 30° C. to about 60° C. being preferred.

In preparing the desired phosphonic acids by using other methods, the reactions are often exothermic and thus difficult to control and handle; however, the preferred reaction is endothermic and thus such advantages as better control of process conditions, faster reaction times and the like result from the process of the present invention.

The liquid reaction product as hereinbefore described is then heated to elevated temperatures which are generally in the range of about 90° C. to about 180° C. depending upon the particular reactants used and the like and under atmospheric pressure, although sub-atmospheric pressures as well as pressures in excess of atmospheric can be used, and preferably to reflux temperatures (temperatures at which at least some of the reactants and/or product evolve as gases from the liquid reaction product). During this temperature rise the by-product carboxylic acid halide contained in the liquid reaction product is evolved from this product as a gas and collected for further use.

While the reaction product is being maintained under the foregoing temperature conditions at least a portion of the by-product carboxylic acid halide is returned or recycled to this product. Although the by-product halide can be added as a gas, it is preferably added as a liquid (due to better handling and control of the reaction) to the liquid portion of the product and preferably below the exposed surface thereof (sub-surface), that is, for example, the surface from which vapors are evolved during heating. Although some advantages of the present invention can accrue by adding the by-product halide to the vapor being evolved from the liquid portion during heating, this procedure is not preferred due to the possibility of higher losses of the by-product halide from the reaction zone. Although all of the by-product carboxylic acid bromide or chloride collected as hereinbefore described can be returned to the reaction product during the heating, this is not preferred since such an amount is generally in excess of that needed to achieve the advantages of the present invention, thus resulting in the handling of, generally speaking, unnecessary amounts of the by-product halide. Moreover, although extremely low amounts of the by-product halide can be added to the reaction product during the heating to achieve some degree of improvement or advantages of the present invention, it is preferred to add amounts (on a weight basis) of from about 10% to about 50% of the by-product halide evolved during the hereinbefore described heating step. Any amounts of by-product halide which are not used as recycle or returned by-product halide can be hydrolyzed by known methods to carboxylic acid and recycled back for reuse as a reactant in preparing the liquid reaction product.

A normally solid (e.g., solid mass at room temperature of about 25° C.) anhydrous reaction product is formed by the foregoing described heating step which usually contains, in addition to some of the desired product (1-hydroxy, organo-1,1-diphosphonic acids) or derivatives thereof, a complex mixture of products believed to be condensed or dehydrated species, such as polymers, of the desired product and in some cases excess or unreacted by-product carboxylic acid halide.

The desired 1-hydroxy, organo-1,1-diphosphonic acids can be recovered from the normally solid anhydrous reaction product by many and various known methods which include an alcohol treatment as disclosed and described in Canadian Patent 728,189, dated Feb. 15, 1966, and a water and/or steam treatment as disclosed and described in Canadian Patent 701,850 dated Jan. 12, 1965, which are incorporated herein by reference. It is preferred, however, to recover the desired 1-hydroxy, organo-1,1-diphosphonic acids from the normally solid anhydrous reaction product by steaming. The anhydrous reaction product can be treated with steam while being maintained at elevated temperatures, i.e., above about 100° C., and preferably from about 115° C. to about 150° C., and under atmospheric pressure (although sub-atmospheric pressures as well as pressures in excess of atmospheric can be used) thereby volatilizing off carboxylic acids, if present, which can be collected for reuse as a starting material as well as hydrating any of he condensed or dehydrated species of the desired product which may be present. This steaming step yields an aqueous, usually highly concentrated, (preferably greater than about 50% by weight), solution or slurry of the desired product. The steam treatment can be carried out by steaming, that is, by passing or introducing steam (at a temperature at from about 100° C. to about 200° C., preferably in the range of from about 110° C. to about 150° C.) into the anhydrous product in such a manner as to establish intimate contant of the anhydrous product with the steam such as by steam sparging and the like.

Depending upon, inter alia, the reactants used, reaction conditions, and the amount of by-product carboxylic acid halide returned to the liquid reaction product, in some cases (preferably the batch method, infra), it may be necessary to add water to the normally solid anhydrous reaction product prior to recovering the desired product from the normally solid anhydrous reaction product. The amount of water which can be added can vary but is usually in an amount which will cause the exothermic reaction of the anhydrous product (due to the addition of the water) to substantially subside or cease. Such an amount is usually from about 1% to about 40% by weight of the anhydrous product and preferably from about 10% to about 20%.

The 1-hydroxy, organo-1,1-diphosphonic acids, normally solid materials, may be recovered from the aqueous medium, if desired, as crystals, by various methods such as, removing the water by evaporation including vacuum evaporation, allowing the compounds to crystallize by cooling a relatively hot saturated aqueous solution, allowing the compounds to crystallize from a saturated solution by seeding the solution, precipitating by the addition of a miscible solvent in which the compounds are less soluble, such as methanol, ethanol, acetone and the like. Usually the amorphous forms of the compounds can be formed when the water of solution is quickly removed under high temperature conditions such as by flash drying, drum drying and the like.

The reaction can be carried out by many and various methods. For example, in a batch process, the lower aliphatic mono-carboxylic acid reactant can be charged to a suitable reaction vessel equipped with a stirrer and the phosphorus trihalide added either continuously or intermittently to the carboxylic acid under agitation and preferably below the surface thereof to avoid loss of the phosphorus trihalide reactant. Thereafter, the reactants can be moderately heated to prepare the liquid reaction product and then further heated to elevated temperatures to remove the by-product organo-halide from the reaction vessel. This by-product organo-halide can then be returned to the reaction vessel during the heating step and thereafter the product can be steam treated in order to recover the desired 1-hydroxy, organo-1,1-diphosphonic acid.

Another method which can be used is a continuous method whereby the reactants are continuously fed into suitable reaction vessels with the rate of feed of the reactants as well as other reaction conditions, such as temperature, used to insure the continuous withdrawal of the desired product. This can be accomplished by, for example, a series of four reaction vessels in which the liquid reaction product is prepared in a first vessel, then passed to a second vessel in which the by-product organo-halide is distilled off and the remaining product is then passed to a third reaction vessel and heated under elevated temperature conditions while returning to this vessel at least a portion of the by-product organo-halide distilled off in the second vessel to prepare a normally solid anhydrous reaction product and thereafter passing the product to a fourth vessel in which the steaming step can be performed. The sojourn times in each vessel can be coordinated such that each are about equal, that is, for example, a sojourn time in each vessel of from about 30 to 90 minutes, thus resulting in a relatively continuous passing of reactants into the reaction and exiting of the desired product.

The following examples are presented to illustrate the invention, with parts by weight being used in the examples unless otherwise specified.

EXAMPLE I

A charge of about 210 parts of glacial acetic acid is placed in a suitable reaction vessel and heated to about 35° C. About 137 parts of $PCl_3$ are added under agitation over a period of about 30 minutes with the temperature maintained by heating at about 35° C. The liquid reaction product formed is heated to a temperature of about 115°–120° C. while during the rise in temperature about 160 parts of the by-product acetyl chloride and minor amounts of HCl (about 20 parts) and acetic acid (about 15 parts) are distilled off and collected. About 40 parts of the acetyl chloride distillate is added below the surface of the reaction product at a rate at which the temperature of the batch can be maintained at a temperature of about 120° C. (±10° C.) (about 30 minutes to 60 minutes are usually required) in order to form a normally solid anhydrous reaction product. The desired product, 1-hydroxy, ethylidene-1,1-diphosphonic acid, is recovered from the anhydrous reaction product by adding about 20 parts of water to the batch at a rate at which the exotherm can be controlled to hold the batch at about 120–125° C. (usually about 30 minutes). Steam sparging is then started and continued while the batch is heated to about 135° C.–140° C. (usually about 60 minutes). The desired product, containing about 15% by weight of water, yields about 99.6% based on phosphorus and about 0.4% phosphorus acid.

EXAMPLE II

A continuous charge of about 210 parts of glacial acetic acid and about 137 parts of $PCl_3$ are maintained in a suitable reaction vessel over a period of about 60 minutes under agitation and heated at a temperature of about 35° C. in order to prepare a liquid reaction product. From this vessel, a liquid reaction product is continuously passed to another suitable reaction vessel where it is heated over a period of about 60 minutes to a temperature of about 110° C. while by-product acetyl chloride and minor amounts of HCl and unreacted acetic acid are distilled off and collected during the heating. The remaining product is then continuously passed to a third suitable reaction vessel wherein about 40 of acetyl chloride distillate (obtained from the foregoing vessel) is returned over a period of about 60 minutes to the reaction product while this product is being maintained at a temperature of about 115° C. (±10° C.). The product is then continuously passed to a fourth vessel in which the desired product, 1-hydroxy, ethylidene-1,1-diphosphonic acid, is recovered by steam sparging for about 60 minutes while the product is maintained at about 136–140° C.

EXAMPLE III

A charge of about 300 parts of n-butyric acid is placed in a suitable reaction vessel and heated to about 60° C. and about 136 parts of $PCl_3$ areadded under agitation over a period of about 30 minutes with the temperature maintained by heating at about 60° C. The liquid reaction product formed is heated to a temperature of about 140° C. while by-product n-butyric acid chloride and minor amounts of HCl and excess butyric acid are distilled off and collected. About 65 parts of the n-butyric acid chloride distillate are added below the surface of the reaction product at a rate at which the temperature of the batch can be maintained at about 140° C. to form a normally solid anhydrous reaction product. The desired product, 1-hydroxy, butylidene-1,1-diphosphonic acid, is recovered from the normally solid anhydrous reaction product by adding about 30 parts of water to the batch at a rate at which the exotherm can be controlled to hold the batch at about 140° C. and thereafter steam sparging is then started and continued for about 60 minutes while the batch is heated to about 160° C.

EXAMPLE IV

A charge of about 259 parts of propionic acid is placed in a suitable reaction vessel and heated to about 45° C. and about 137 parts of $PCl_3$ are added under agitation over a period of about 30 minutes with the temperature maintained by heating at about 45° C. The liquid reaction product formed is heated to a temperature of about 130° C. (±5° C.) while by-product propionic acid chloride and minor amounts of HCl and excess propionic acid are distilled off and collected. About 55 parts of the propionic acid chloride distillate are added below the surface of the reaction product at a rate at which the temperature of the batch can be maintained at about 130° C. (±5° C.) to form a normally solid anhydrous reaction product. The reaction product is cooled to about 100° C. and about 100 parts of methanol are carefully added onto the surface of the product under agitation with the temperature being allowed to drop to about 60° C. After thorough mixing, the volatile components are distilled off. The desired product, 1-hydroxy, propylidene-1, 1-diphosphonic acid, is recovered by adding a little water to the distillation residue and allowing such to crystallize fherefrom.

EXAMPLE V

A charge of about 220 parts of glacial acetic acid is placed in a suitable reaction vessel and heated to about 35° C. About 270 parts of $PBr_3$ are added under agitation over a period of about 30 minutes with the temperature maintained by heating at about 35° C. The liquid reaction product formed is heated to a temperature of about 115° C.–120° C. while during the rise in temperature by-product acetyl bromide and minor amounts of HBr and acetic acid are distilled off and collected. About 50 parts of acetyl bromide distillate is added below the surface of the reaction product at a rate at which the temperature of the batch can be maintained at a temperature of about 120° C. (±10° C.) (about 30 minutes to 60 minutes are usually required) in order to form a normally solid anhydrous reaction product. The desired product, 1-hydroxy, ethylidene-1,1-diphosphonic acid, is recovered from the anhydrous reaction product by adding about 20 parts of water to the batch at a rate at which the exotherm can be controlled to hold the batch at about 120–125° C. (usually about 30 minutes). Steam sparging is then started and continued while the batch is heated to about 135° C–140° C. (usually about 60 minutes).

What is claimed is:
1. A process for preparing a 1-hydroxy, organo-1,1-diphosphonic acid which comprises the sequential steps of:
   (1) reacting at a temperature of from about 10° C. to about 80° C. in a reaction zone an unsubstituted lower aliphatic monocarboxylic acid and a phosphorus trihalide selected from the group consisting of phosphorus tribromide and phosphorus trichloride in a molar ratio of at least about 2:1 to form a liquid reaction product,
   (2) heating said liquid product in said reaction zone to temperatures of from about 90° C. to about 180° C. while removing by-product organo-halide as a gas from said reaction zone, said organo halide being collected for use as hereinafter specified,
   (3) returning at least a portion of said collected by-product organo-halide to said reaction zone by adding said by-product organo-halide to said liquid product being maintained at said temperatures whereby a normally solid anhydrous reaction product is formed, and thereafter, (4) recovering said 1 - hydroxy, organo - 1,1 - diphosphonic acid from said anhydrous reaction product.

2. A process for preparing a 1-hydroxy, lower alkylidene-1,1-diphosphonic acid according to claim 1, wherein said lower aliphatic mono-carboxylic acid is a lower alkyl mono-carboxylic acid.

3. A process for preparing 1-hydroxy, ethylidene-1, 1-diphosphonic acid according to claim 2, wherein said lower alkyl mono-carboxylic acid is acetic acid.

4. A process according to claim 1, wherein said 1-hydroxy, organo-1,1-diphosphonic acid is recovered from said normally solid product by steaming.

5. A process according to claim 4, wherein said by-product organo-chloride returned to the reaction zone is from about 10% to about 50% by weight of the by-product organo-chloride removed from said reaction zone and is added as a liquid sub-surface to said liquid product.

6. A process according to claim 5, wherein said lower aliphatic mono-carboxylic acid and phosphorus trihalide is reacted in a molar ratio of at least about 3:1 and at temperatures of from about 30° C. to about 60° C. to form said liquid reaction product.

7. A process according to claim 6, wherein said steaming of said anhydrous product is carried out while said anhydrous product is being maintained at a temperature of from about 115° C. to about 150° C.

8. A process for preparing a 1-hydoxy, lower alkylidene-1,1-diphosphonic acid according to claim 7, wherein said lower aliphatic mono-carboxylic acid is a lower alkyl mono-carboxylic acid.

9. A process for preparing 1-hydroxy, ethylene-1,1-diphosphonic acid according to claim 8, wherein said lower alkyl mono-carboxylic acid is acetic acid.

10. A process according to claim 9, wherein said phosphorus trihalide is phosphorus trichloride.

11. A process according to claim 9, wherein said phosphorus trihalide is phosphorus tribromide.

12. A process according to claim 9, wherein said process steps are carried out in a continuous manner.

13. A process for preparing 1-hydroxy propylidene-1,1-diphosphonic acid according to claim 8, wherein said lower alkyl mono-carboxylic acid is propionic acid.

14. A process according to claim 13, wherein said process steps are carried out in a continuous manner.

15. A process according to claim 13, wherein said phosphorus trihalide is phosphorus trichloride.

16. A process according to claim 13, wherein said phosphorus trihalide is phosphorus tribromide.

References Cited

FOREIGN PATENTS

| 672,168 | 3/1966 | Belgium. |
| 728,189 | 2/1966 | Canada. |
| 978,297 | 12/1964 | Great Britain. |

OTHER REFERENCES

Brooks: "J. Am. Chem. Soc.," vol. 34 (1912), pp. 492 to 499.

Sunner et al.: "Svensk Kemisk Iidskrift," vol. 54 (1942), pp. 163 to 167.

LEON ZITVER, *Primary Examiner.*

J. E. EVANS, *Assistant Examiner.*

U.S. Cl. X.R.

260—544

PO-1050
(5/69)

UNITED STATES PATENT OFFICE
CERTIFICATE OF CORRECTION

Patent No. 3,449,409    Dated  June 10, 1969

Inventor(s)  Riyad R. Irani & Robert S. Mitchell

It is certified that error appears in the above-identified patent and that said Letters Patent are hereby corrected as shown below:

Column 5, line 53, after the figure "40" and before the word "of" insert -- parts --.

SIGNED AND SEALED
AUG 25 1970

(SEAL)
Attest:

Edward M. Fletcher, Jr.
Attesting Officer

WILLIAM E. SCHUYLER, JR.
Commissioner of Patents